(12) United States Patent
Hu et al.

(10) Patent No.: US 8,309,648 B2
(45) Date of Patent: Nov. 13, 2012

(54) SILICONE FREE DEFOAMER FOR SOLVENT BASED COATINGS

(75) Inventors: Weiqiu Hu, Shanghai (CN); Frank Oliver Heinrich Pirrung, Grünstadt (DE); Petrus Johannes Harbers, Shanghai (CN); Chuanjin Zhu, Shanghai (CN); Min Zhu, Shanghai (CN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/992,095

(22) PCT Filed: May 6, 2009

(86) PCT No.: PCT/EP2009/055463
§ 371 (c)(1),
(2), (4) Date: Mar. 3, 2011

(87) PCT Pub. No.: WO2009/138343
PCT Pub. Date: Nov. 19, 2009

(65) Prior Publication Data
US 2011/0166284 A1    Jul. 7, 2011

(30) Foreign Application Priority Data
May 15, 2008   (EP) .................................. 08156213

(51) Int. Cl.
*C08L 51/00*    (2006.01)
*C08L 31/00*    (2006.01)

(52) U.S. Cl. ........................................ 524/504; 524/533
(58) Field of Classification Search ................... 524/504
See application file for complete search history.

(56) References Cited

U.S. PATENT DOCUMENTS

| 3,388,072 A | 6/1968 | Elemer |
| 5,187,201 A * | 2/1993 | Haubennestel et al. ......... 524/31 |
| 6,107,392 A * | 8/2000 | Antonelli et al. ............. 524/504 |
| 6,913,831 B2 * | 7/2005 | Suzuki ....................... 428/425.1 |
| 2008/0033099 A1 * | 2/2008 | Bosway ....................... 524/502 |

FOREIGN PATENT DOCUMENTS
WO   2008/016545 A   2/2008

* cited by examiner

*Primary Examiner* — Hui Chin
(74) *Attorney, Agent, or Firm* — Shruti Costales PLLC

(57) ABSTRACT

This disclosure relates to a silicone free defoamer for solvent based coatings, especially clear wood coatings preferably based on a graft copolymer of poly alkyl vinyl ether. The coating composition comprises a resin binder component and a defoamer formulation.

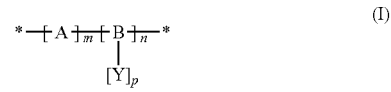

(I)

10 Claims, No Drawings

SILICONE FREE DEFOAMER FOR SOLVENT BASED COATINGS

The invention relates to a silicone free defoamer for solvent based coatings, especially clear wood coatings preferably based on a graft copolymer of poly alkyl vinyl ether.

U.S. Pat. No. 3,127,352 (1964) describes polyvinyl ether used as defoamers in mineral oils. The polyvinyl ether may be copolymerized with one or more ethylenically unsaturated compounds containing non-ether groups.

U.S. Pat. No. 3,658,943 (1972) describes a resin composition comprising a thermoplastic resin and a graft copolymer comprising methyl methacrylate grafted onto an alkyl vinyl ether backbone polymer. The copolymer improves the workability, for example, the extrusion.

U.S. Pat. No. 3,796,774 (1974) describes a graft copolymer composition comprising methyl methacrylate alone or together with one or more additional vinyl monomers like styrene monomers grafted onto an alkyl vinyl ether. The graft polymer is produced by free radical polymerisation and used as resin additive to improve the extrusion.

U.S. Pat. No. 5,187,201 (1993) describes coating compositions containing an amount of alkyl vinyl ether polymer which is effective for improving leveling and/or preventing or eliminating foam.

The alkyl vinyl ether polymer is a copolymer containing monomers of the general Formula RO—CH═CH2 and R'O—CH═CH2.

WO2008/016545 describes the grafting polymerization of acrylic chains onto chlorinated olefins as backbone structure.

When used in coatings, high molecular weight polyvinyl alkyl ethers often cause coating defects, for example in the form of leveling defects and craters. A further disadvantage of these products is that in unpigmented resin systems this incompatibility also causes pronounced cloudiness in the coating.

A defoamer has two antagonistic properties that is its compatibility and defoaming performance, increasing one tends to decrease the other. Therefore, it is very difficult to find a defoamer with strong defoaming efficiency and compatibility at the same time.

This invention focuses on finding a suitable approach to reach the good balance between high defoaming efficiency and compatibility for a wide range of coating systems, e.g. alkyd, clear coating, synthetic fatty acid, (meth)acrylic acid and the like.

Thus, the invention relates to a coating composition comprising a resin binder component, and a defoamer formulation comprising a) a graft copolymer of the Formula

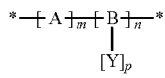

wherein

A are polymerizable monomers or comonomers selected from alkyl vinyl ether, phenyl vinyl ether, allyl ether, acrylate, methacrylate, olefin, maleic anhydride or styrene;

$[A]_m$ represents a homopolymer or copolymer or a mixture thereof containing one or more monomers A and being the graft backbone and being selected from poly alkyl vinyl ether, poly phenyl vinyl ether, poly allyl ether, polyacrylate, poly methacrylate, poly(alkyl vinyl ether-co-acrylate), polyolefin, alkyl vinyl ether-maleic anhydride copolymer or polystyrene;

$[B]_n$ represents the units in the backbone $[A]_{m+n}$ where a branch is grafted from the unit in the backbone;

Y are polymerizable monomers or comonomers selected from (meth)acrylate, styrene, vinyl acetate;

$[Y]_p$ is a grafting chain which is a homo/copolymer of one or more monomers selected from (meth)acrylate, styrene, vinyl acetate with p=1-5000;

m is a number between 1-5000, n is a number of 1-5000; and m+n is a number of 30-5000.

b) polymer, mixed polymers or copolymer $[A]_{m+n}$; and c) polymer, mixed polymer or copolymer of the monomer(s) Y.

DEFINITIONS

The polymer $[A]_m$ is used as the starting polymer which is the backbone in the final graft copolymer. After reacting with the initiator it could form the grafting points. The range of the molecular weight depends on the property of the backbone homo/copolymer and the monomer/comonomer used. For example, when poly(isobutyl vinyl ether) is used as starting material, the suitable Mn is between 3000-40000 g/mol, preferably 5000-35000 g/mol which also depends on the modification monomer used.

One or more points in the polymer chain could become the reactive site during the reaction. For example, when poly(isobutyl vinyl ether) is used as starting material, the two possible sites for grafting are point a and b in the following figure where the tert-H could be abstracted to form the reactive point;

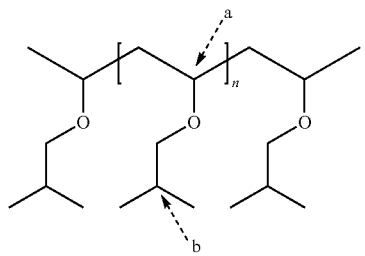

In a first embodiment the backbone polymer $[A]_m$ is a homopolymer or copolymer of polyalkylvinyl ether or polyphenyl vinyl ether. (claim 2).

Polyalkylvinyl ether is the homo/copolymer of one or more alkyl vinyl ether monomers containing identical or different repeating units of the following Formula 1 and/or with one or more ethylenically unsaturated compound containing non-ether groups for example those of the Formula 2.

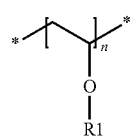

1

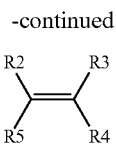

2 wherein R1-5 are the same or different and are selected from hydrogen, hydrocarbyl, substituted hydrocarbyl or radicals containing inert functional groups.

A "hydrocarbyl" is a univalent group containing only carbon and hydrogen, including alkyl group, cycloalkyl group, alkenyl group, alkynyl group, aromatic group, polycyclic hydrocarbon, heterocyclic group. If not otherwise stated, it is preferred that hydrocarbyl group herein is containing 1 to about 30 carbon atoms;

The examples for $C_{1-30}$ alkyl group are methyl, ethyl, i-propyl, n-propyl, n-butyl, i-butyl, t-butyl, n-amyl, isoamyl, t-amyl, 2-ethylhexyl, decyl, dodecyl, tetradecyl, hexadecyl, octadecyl and the like.

A "substituted hydrocarbyl" is meant a hydrocarbyl which contains one or more substituent groups which are inert under the process conditions to which the compound containing these groups is subjected. The substituent groups also do not substantially interfere with the process. If not otherwise stated, it is preferred that hydrocarbyl group herein contain 1 to about 30 carbon atoms. Included in the meaning of "substituted" are aromatic group, heteroaromatic rings, polycyclic hydrocarbon, heterocyclic group, halocarbon.

An "inert functional group" herein is meant a group other than hydrocarbyl or substituted hydrocarbyl which is inert under the process conditions to with the compound containing the group is subjected. The inert functional group herein include groups containing an oxygen atom, groups containing a nitrogen atom or groups containing halogen. Examples of inert functional groups include halogen (fluoro, chloro, bromo and iodo), ether (—$OR^6$ or -$TOR^7$), ester of $C_1$-$C_{10}$, amine of $C_1$-$C_{10}$, alkoxyl of $C_1$-$C_{10}$, nitrile group.

An "ether" herein is meant —$OR^6$ or -$TOR^7$;

A "group containing nitrogen atom" herein is meant

—$NR^9R^{10}$, -T-$NR^{11}R^{12}$

T is hydrocarbyl, substituted hydrocarbyl and inert functional group. If not otherwise stated, it is preferred that group herein contain 1 to about 30 carbon atoms.

A "group containing oxygen atom" herein is meant hydroxyl, alkoxy (—$OR^{13}$), group with -T-$OR^{14}$; —COOH, -T-COOH, —$COOR^{15}$, -T-$COOR^{16}$.

A "group containing halogen" herein is meant any group containing halogen (F, Cl, Br, I) which is different with halocarbon.

A "halocarbon" herein is meant the substituted hydrocarbyl with one or more C—X, where X=F, Cl, Br, I. For example $C_mF_{2m+1}$-$(CH_2)_2$-group where m is a number from 1-18, preferably 4-18.

$R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$ are each independently hydrogen, halogen (F, Cl, Br, I), hydrocarbyl, substituted hydrocarbyl or inert functional group. Each group above may be same or different, and provided that any two of them which are vicinal may link to one another or to form a ring.

The poly alkyl vinyl ether is preferably selected from poly methyl vinyl ether, poly ethyl vinyl ether, n-propyl vinyl ether, poly isopropyl vinyl ether, poly n-hexyl vinyl ether, poly isobutyl vinyl ether (PIBVE), poly t-butyl vinyl ether, poly(2-ethylhexyl vinyl ether), poly hydroxyl butyl vinyl ether, poly cyclohexyl vinyl ether, polyvinyl ether of the Formula $CH_2$=CH—O—$(CH_2)_2$—$(CF_2)_6$—$CF_3$, polyvinyl ether of the Formula $CH_2$=CH—O—$(CH_2)_4$—$(CH_2$—$CH_2$—O$)_8$—$CH_3$. (claim 3)

The poly alkyl vinyl ether is more preferably selected from poly isobutyl vinyl ether (PIBVE), poly methyl vinyl ether; poly (2-ethylhexyl vinyl ether); poly isopropyl vinyl ether; poly 2-methylbutyl vinyl ether; poly cyclohexyl vinyl ether.

In another embodiment the backbone polymer $[A]_m$ is a homopolymer or copolymer of polyacrylate, polymethacrylate and polystyrene. (claim 4)

Poly(meth)acrylate is the alkyl acrylate homo/copolymer containing identical or different repeating units of the following Formula 3

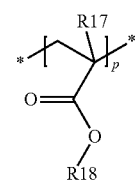

3 in which $R^{17}$ represents hydrogen or a methyl group and $R^{18}$ represents hydrocarbyl, substituted hydrocarbyl or an inert functional group.

Poly(meth)acrylate is the homo/copolymer of monomers preferably selected from methyl (meth)acrylate, t-butyl (meth)acrylate, i-butyl (meth)acrylate, 2-ethylhexyl (meth)acrylate, 2-acetoacetoxyethyl (meth)acrylate (Formula 4), 2-(2-ethoxyethoxy)ethyl acrylate (Formula 5), (methoxy polyethylene glycol) (meth)acrylate (Formula 6) and the like.

(claim 5)

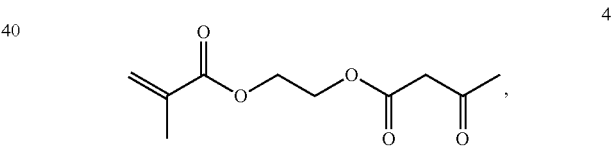

4

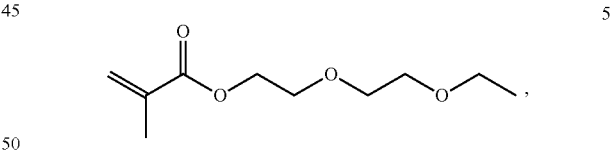

5

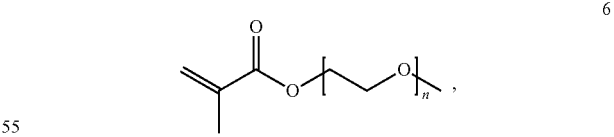

6 n = 1-30

$R^1$ in Formula 1 and $R^{18}$ in Formula 3 are preferably selected from the group consisting of

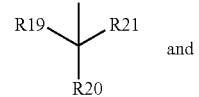

7 and

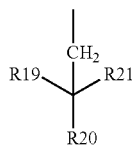

wherein at least two of $R^{19}$, $R^{20}$, $R^{21}$ are members selected from hydrocarbyl, substituted hydrocarbyl, radicals containing inert functional group, radicals which consists of alkyl, aryl, cycloalkyl, for example, isopropyl, isobutyl, t-butyl, 2-ethylhexyl, and the unsubstituted R group is hydrogen.

In one embodiment the backbone polymer $[A]_m$ is a polyolefin. (claim 6)

Polyolefin is preferably selected from polypropylene, polybutadiene, polyvinylchloride.

In one embodiment the polymer $[A]_m$ is a copolymer, such as
  Copolymer of alkyl vinyl ether, such as poly(isobutyl vinyl ether-co-methyl vinyl ether), poly(isobutyl vinyl ether-co-(methoxy polyethylene glycol vinyl ether), poly (methyl vinyl ether-co-2-ethylhexyl vinyl ether) and the like;
  Copolymer of (meth)acrylate: such as poly(2-ethyl hexyl (meth)acrylate-co-methyl methacrylate), poly(t-butyl acrylate-co-ethyl acrylate), poly(t-butyl acrylate-co-acetoacetoxyethyl methacrylate) etc.;
  Copolymer of alkyl vinyl ether and (meth)acrylate: such as poly(isobutyl vinyl ether-co-butyl acrylate), poly(isobutyl vinyl ether-co-2-ethylhexyl acrylate), poly(2-ethylhexyl vinyl ether-co-isobutyl methacrylate) etc.; (claim 7).

In one embodiment the polymer $[A]_m$ is a polymer mixture. (claim 8)

The grafting chain $[Y]_p$ could be a homo/copolymer of one or more monomers selected from (meth)acrylate, styrene, vinyl acetate and their derivatives. (claim 9)

The example of monomers are methyl acrylate, methyl methacrylate (MMA), t-butyl (meth)-acrylate, i-butyl (meth) acrylate, 2-(2-ethoxyethoxy)ethyl acrylate, 2-acetoacetoxyethyl (meth)acrylate, (methoxy polyethylene glycol)vinyl ether acrylate or styrene and t-butyl styrene.

A polymer or copolymer of the monomer Y is selected from a poly(meth)acrylate or a polystyrene, for example, polymethyl(meth)acrylate, poly(n-butyl (meth)acrylate), poly(1-butyl (meth)acrylate), poly(t-butyl(meth)acrylate), poly(2-(2-ethoxyethoxy)ethyl acrylate), polystyrene, poly(p-t-butyl styrene), poly(methyl(meth)acrylate-co-styrene) and poly(methyl-(meth)acrylate-co-t-butylacrylate) etc.

m is a number between 1-5000, n is a number of 1-5000 m+n is a number between 30-5000. For example, when poly (isobutyl vinyl ether) polymer is used as starting polymer, m is preferably 30-500 and more preferably 50-350.

The resin binder component is any common binder resin, e.g. an alkyd resin, a synthetic fatty acid resin, an (meth) acrylic acid resin and the like.

The starting material in the defoamer formulation of the invention is a kind of polymer which has the following characteristics:
  ① the polymer itself has the defoaming characteristic for the aimed system;
  ② after reacting with the initiator, it could generate the grafting points;
  ③ the specification of the starting polymer should have a suitable range.

Process 2.1 Synthesis of the defoamer samples as represented is achieved by the polymerization. The branches are generated by at least one monomer/comonomer grafted from the starting polymer at the reactive points formed by the reaction of the initiator with the starting polymer. The type of polymerization includes radical polymerization, cationic polymerization, anionic polymerization and the combination of them with or without initiator or initiator system.

2.2 An initiator or initiator system for the polymerization and copolymerization are normally those classic initiator or initiator systems for controlled/no controlled radical polymerization, cationic polymerization, anionic polymerization;

2.3 An initiator or initiator system for the radical polymerization as recited in 2.1 is inorganic/organic peroxide, azo initiators and redox initiator, such as benzoyl peroxide, lauroyl peroxide, t-amyl peroxy-2-ethylhexanoate, 2,5-dimethyl-2,5-di(2-ethylhexanoyl-peroxy)hexane, 1,1,3,3-tetramethylbutyl-peroxy-2-ethylhexanoate, t-butyl peroxy-2-ethylhexanoate, t-butyl peroxyisobutyrate, t-butyl peroxydiethylacetate, t-butyl peroxy-3,5,5-trimethylhexanoate and redoxy initiator such as benzoyl peroxide and N,N-di-methyl aniline; The polymerization conditions are as follows: 1 atm, 10-200° C., preferably 20-120° C., under $N_2$ atmosphere.

2.4 A 'redox initiator' recited in 2.3 is formed by oxidant and reducer agent which could generate a radical species based on a redox reaction. The oxidant is diacyl peroxides, diaryl peroxides, alkyl peroxides, dialkyl peroxydicarbonates, hydroperoxides, per-esters, and the reducer is alcohols, thiols, ketones, aldehydes, amines and amides. The examples of oxidant are benzoyl peroxide, lauroyl peroxide, cumene hydroperoxide and the examples of reducer are N,N-dimethyl aniline, N-vinylimidazole, N-vinylcarbazole, N,N-dimethyl-4-toluidine, tetraethylene pentamine;

2.5 An "initiator system" in 2.2 is meant the system formed by initiator mentioned above or the initiator supported on the carrier or polymeric initiator or initiator combined with coinitiator;

2.6 A "carrier" herein is meant polymer materials, silica, alumina, magnesium chloride titanium dioxide or the mixtures of two or more materials mentioned above;

2.7 The initiator or initiator system is using for the different type polymerization and copolymerization wherein the said initiator or initiator system could be used as homogeneous or heterogenous initiator or initiator system to (co) polymerization under the following conditions: polymerization pressure is 0.1~10 Mpa, polymerization temperature is −50~200° C., preferably 30-150° C., under $N_2$ atmosphere. The descriptions of "initiator", "initiator system" and "coinitiator" are each independently as same as recited in paragraph 2.2-2.5 above.

Preparation:

The defoamer formulation is prepared by polymerizing monomer Y in the presence of starting (co)polymer $[A]_m$ at 10-150° C. thus obtaining a mixture of a graft copolymer as described in claim 1, starting polymer $[A]_m$ and polymer(s) formed by monomer(s) Y (claim 10)

The graft copolymer is synthesized via free radical polymerization, cationic polymerization, anionic polymerization and combination of them. According to the synthetic strategy, the key parameters are (1) the right choice of starting polymer (2) molecular weight of starting polymer; (3) modification process of the starting material; (4) type of branched monomers; (5) the amount of branches and the length of the branch which could be determined by reaction condition and relative molar ratio of used monomer(s) to the starting polymer; (6) reaction conditions, including the type of initiator, reaction temperature and reaction time.

Advantages

The defoamer of this invention generally show improved compatibility while keeping very high efficient defoaming efficiency in a wide range of coating system, e.g. alkyd, synthetic fatty acid, acrylic acid and coating system.

Due to the improved compatibility compared to only using starting polymer $[A]_m$ itself like poly alkyl vinyl ether as defoamer, less haze, less film defects and higher gloss will be obtained.

Suitable cheaper monomer, like methyl methacrylate and styrene could be used compared to those expensive monomer used in the prior arts and the formulation could be easily adjusted according to different needs.

Use

The invention further relates to the use of a defoamer formulation according to claim 1 as defoamer for solvent based coating systems, preferably for alkyd systems, clear coatings, synthetic fatty acid systems or (meth) acrylic acid systems and the like.

EXAMPLES

Synthesis

Example 1

Graft Copolymer of Methyl Methacrylate with Poly(Isobutyl Vinyl Ether)

Graft copolymer of methyl methacrylate with poly(isobutyl vinyl ether) ($Mn=3\times10^4$ g/mol, PDI=2.38) was prepared as follows: to a 4-necked, 100 ml flask equipped with mechanical stirrer, reflux condenser, addition funnel and nitrogen inlet were charged 15 g poly(isobutyl vinyl ether) solution (37% in petroleum ether) and 0.17 g dibenzoyl peroxide (70% solid content, remainder water). The mixture was heated at 75° C. under nitrogen and 3 ml methyl methacrylate was added dropwise during 3 hours. After the dropwise addition phase had ended, the time allowed for future reaction was 18 hours, and the white viscous material formed was diluted to 20% with xylene.

Example 2

Graft Copolymer of Methyl Methacrylate and Styrene with Poly (Isobutyl Vinyl Ether)

Graft copolymer of methyl methacrylate and styrene with poly (isobutyl vinyl ether) ($Mn=1.7\times10^4$ g/mol, PDI=1.83) was prepared as follows: to a 4-necked, 250 ml flask equipped with mechanical stirrer, reflux condenser, addition funnel and nitrogen inlet were charged 70 g poly(isobutyl vinyl ether) solution (37% in petroleum ether), 10 ml xylene, and 0.68 g dibenzoyl peroxide (70% solid content, remainder water). The mixture was heated at 75° C. under nitrogen and 12 ml methyl methacrylate and 3 ml Styrene were added dropwise during 3 hours. The reaction continued for another 15 hours and the white viscous material formed were diluted to 20% with xylene.

Example 3

Copolymer of Methyl Methacrylate with Poly(T-Butyl Acrylate)

10 g xylene were initially introduced under nitrogen into a 4-necked flask equipped with mechanical stirrer, reflux condenser, addition funnel and nitrogen feed. 72 g t-butyl acrylate and 0.40 g azobis(isobutyronitrile) (AIBN) were mixed and added dropwise into the above flask over a period of 1 hr at a reaction temperature 60° C. After the dropwise addition phase had ended, the time allowed for future reaction was 7 hours at 60° C., and the polymer formed ($Mn=4.5\times10^4$ g/mol, PDI=2.5) were diluted with 200 ml xylene. 1.7 g dibenzoyl peroxide (70% solid content, remainder water) was added to the flask and the mixture was heated to 75° C., 60 ml methyl methacrylate was added dropwise during 4 hours. The polymerization continued for another 16 hours and the viscous material formed were diluted to 20% with xylene.

Example 4

Graft Copolymer of Styrene with Poly(Methyl Vinyl Ether)

Graft copolymer of styrene with poly(methyl vinyl ether) ($Mn=4.2\times10^4$ g/mol, PDI=2.59) was prepared as follows: to a 4-necked, 100 ml flask equipped with mechanical stirrer, reflux condenser, addition funnel and nitrogen inlet were charged 15.8 g poly(methyl vinyl ether) solution with 35% solid content, and 0.17 g dibenzoyl peroxide (70% solid content, remainder water). The mixture was heated at 75° C. under nitrogen and 6 ml styrene was added dropwise during 3 hours. The reaction continued for another 18 hours and the viscous material formed were diluted to 20% with Solvesso 100.

Example 5

Graft Copolymer of Styrene with Poly (Isobutyl Vinyl Ether-Co-Butyl Acrylate)

Graft copolymer of styrene with poly (isobutyl vinyl ether-co-butyl acrylate) ($Mn=3.0\times10^4$ g/mol, PDI=2.47) was prepared as follows: to a 4-necked, 100 ml flask equipped with mechanical stirrer, reflux condenser, addition funnel and nitrogen inlet were charged 32 g poly(methyl vinyl ether) solution with 35% solid content, and 0.34 g dibenzoyl peroxide (70% solid content, remainder water). The mixture was heated at 75° C. under nitrogen and 12 ml styrene was added dropwise during 3 hours. The reaction continued for another 18 hours and the white viscous material formed were diluted to 20% with Solvesso 100.

Example 6

Graft Copolymer of Styrene with Poly(Isobutyl Vinyl Ether)

Graft copolymer of styrene on poly(isobutyl vinyl ether) ($Mn=3.0\times10^4$ g/mol, PDI=2.38) was prepared as follows: 32 g poly(isobutyl vinyl ether) solution with 35% solid content was initially introduced under nitrogen into a 4-necked, 100 ml flask equipped with mechanical stirrer, reflux condenser and nitrogen inlet. Redox initiator, 0.24 g dibenzoyl peroxide (70% solid content, remainder water) and 0.054 g N,N-dimethyl aniline together with 12 ml styrene was added dropwise over a period of 3 hours at 30° C. under nitrogen. The polymerization continued for another 15 hours and the white viscous material formed were diluted to 20% with Solvesso 100.

Example 6-1

Using BPEH Initiator

Graft copolymer of styrene on poly(isobutyl vinyl ether) was prepared as follows:

To a 4-necked, 250 ml flask equipped with mechanical stirrer, reflux condenser and nitrogen inlet were charged 32 g poly(isobutyl vinyl ether) solution with 35% solid content, 0.14 ml t-butyl peroxy-2-ethylhexanoate (BPEH). The flask was purged by nitrogen for about 0.5 h and then heated to 90° C. under nitrogen. 0.14 ml BPEH in 9.5 ml styrene was added dropwise over a period of 3 hours. The total reaction time is about 20 hr from heating. The white viscous liquid formed was diluted to 15% with Solvesso 100 (S-100).

Example 6-2

Using BPEH Initiator

Graft copolymer of styrene on poly(isobutyl vinyl ether) was prepared as follows:

To a 4-necked, 250 ml flask equipped with mechanical stirrer, reflux condenser and nitrogen inlet were charged 30 g poly(isobutyl vinyl ether) solution with 35% solid content, 4.75 ml styrene and 0.14 ml t-butyl peroxy-2-ethylhexanoate (BPEH). The flask was purged by nitrogen for about 0.5 h and then heated to 85° C. under nitrogen. After 1 hour the system turns to white and 0.14 ml BPEH in 4.75 ml styrene was added dropwise over a period of 3 hours. Another 20 ml Solvesso 100 were added dropwise during 5 hr. The total reaction time is about 20 hr from heating. The white viscous liquid formed was diluted to 15% with Solvesso 100 (S-100).

Example 6-3

Using BPEH Initiator

Graft copolymer of styrene on poly(isobutyl vinyl ether) was prepared as follows:

To a 4-necked, 250 ml flask equipped with mechanical stirrer, reflux condenser and nitrogen inlet were charged 30 g poly(isobutyl vinyl ether) solution with 35% solid content, 9.5 ml styrene and 0.14 ml t-butyl peroxy-2-ethylhexanoate (BPEH). The flask was purged by nitrogen for about 0.5 h and then heated to 90° C. under nitrogen. After 1 hour the system turns to white and 0.14 ml BPEH in 5 ml Solvesso 100 was added dropwise over a period of 2 hours. Another 15 ml Solvesso 100 were added dropwise during 5 hr. The total reaction time is about 20 hr from heating. The white viscous liquid formed was diluted to 15% with Solvesso 100 (S-100).

The following examples were all prepared in a similar manner as Example 6-1 with different amount and additional sequence of initiator, monomer and solvent. T-butyl peroxy-2-ethylhexanoate (BPEH) was used as initiator.

| Ex. | Temp. °C. of oil bath | Initiator BPEH ml in Flask | Monomer in flask ml | Initiator BPEH in drip funnel ml | Monomer in drip funnel ml | Solvent (S-100) added in drip funnel with initiator ml | Solvent (S-100) added after initiator | Time total hr | Raw Material g |
|---|---|---|---|---|---|---|---|---|---|
| 6-4 | 85 | 0.16 | 0 | 0.12** | 9.5 | 0 | 0 | 24 | 30 |
| 6-5 | 85 | 0.11 | 0 | 0.11** | 4.75 | 0 | 0 | 24 | 15 |
| 6-6 | 90 | 0.14 | 0 | 0.14** | 4.75 | 0 | 0 | 24 | 15 |
| 6-7 | 90 | 0.27 | 0 | 0 | 4.75 | 0 | 0 | 20 | 15 |
| 6-8 | 90 | 0.0 | 0 | 0.27** | 4.75 | 0 | 0 | 24 | 15 |
| 6-9 | 75 | 0.17 | 0 | 0 | 4.0 | 0 | 0 | 24 | 15 |
| 6-10 | 90 | 0.07 | 0 | 0.07** | 4.75 | 0 | 0 | 24 | 15 |
| 6-11 | 90 | 0.14 | 9.5 | 0.14*** | 0 | 10 | 0 | 24 | 30 |
| 6-12 | 90 | 0.14 | 47.5 | 0.14**** | 4.75 | 20 | 0 | 24 | 30 |
| 6-13 | 90 | 0.7 | 47.5 | 0.7*** | 0 | 100 | 0 | 24 | 150 |
| 6-14 | 80-85 | 0.14 | 9.5 | 0.14*** | 0 | 5 | 25 | 20 | 30 |
| 6-15 | 75 | 0.14 | 9.5 | 0.14*** | 0 | 5 | 25 | 20 | 30 |
| 6-16 | 90 | 0.14 | 9.5 | 0.14*** | 0 | 5 | 0 | 20 | 30 |
| 6-17 | 90 | 0.14 | 9.5 | 0.14*** | 0 | 5 | 0 | 22 | 30 |
| 6-18 | 90 | 0.1 | 9.5 | 0.18*** | 0 | 5 | 15 | 22 | 30 |

**means dropping began after reaching the temperature;
***means dropping began after 1 hr after heating
****means dropping began after 2 hr after heating

Example 7

A Graft Copolymer of Methyl Methacrylate (MMA) and T-Butyl Acrylate with Copolymer of Alkyl Vinyl Ether A graft copolymer of methyl methacrylate (MMA) and t-butyl acrylate with copolymer of alkyl vinyl ether were synthesized as follows:

To a 250 ml 4-necked, 100 ml flask equipped with mechanical stirrer, dry-Ice condenser, addition funnel and nitrogen inlet, 78 g dried Solvesso 100 and 1 ml $BF_3 \cdot Et_2O$ solution in dioxane (0.032M) were introduced under an atmosphere of nitrogen. The flask was cooled to −5° C. by ice-salt bath and then a mixture of 30 ml isobutyl vinyl ether, 7 g $CH_2\!=\!CH\!-\!O\!-\!(CH_2)_2\!-\!(CF_2)_3\!-\!CF_3$ and 5 g $CH_2\!=\!CH\!-\!O\!-\!(CH_2)_4\!-\!O\!-\!(CH_2\!-\!CH_2O)_8\!-\!CH_3$ were added dropwise over a period of 2 hours. Two hours later, a second increment of 0.2 ml catalyst solution was added and after 3 hours the reaction temperature was increased to room temperature for another 3 hours.

The 0.34 g dibenzoyl peroxide was introduced into the flask, and then the flask was heated to 75° C., the mixture of 6 ml MMA and 1.5 ml t-butyl acrylate was added dropwise under nitrogen over a period of 3 hours. The polymerization continued for additional 15 hours.

Example 8-58 were all prepared in a similar manner as Example 1 except that the type and amounts of precursors were varied as detailed in Tables 1, 2 below. If not otherwise stated, dibenzoyl peroxide (solid content: 70% remainder water) was used as the initiator for the above processor.

The starting polymers, the monomers and initiators are defined as follows:
Starting material 1-A: poly (isobutyl vinyl ether) (PIBVE);
Starting material 1-B: poly (methyl vinyl ether);
Starting material 1-C: poly (2-ethylhexyl vinyl ether);
Starting material 1-D: poly (isopropyl vinyl ether);
Starting material 1-E: poly (2-methylbutyl vinyl ether);
Starting material 1-F: poly (cyclohexyl vinyl ether);
Starting material 1-G: poly (phenyl vinyl ether);
Starting material 1-H: poly (methyl vinyl ether-co-2-ethylhexyl vinyl ether);
Starting material 1-I: poly (isobutyl vinyl ether-co-butyl acrylate);
Starting material 1-J: poly (t-butyl acrylate);
Starting material 1-K: poly (1-butyl methacrylate);
Starting material 1-L: poly (2-ethylhexyl acrylate);
Starting material 1-M: poly (t-butyl acrylate-co-ethylacrylate);
Starting material 1-N: the mixer of poly (isobutyl vinyl ether) and poly (isobutyl vinyl ether-co-butyl acrylate) at a ratio 3:1
Monomer 2: methyl methacrylate
Monomer 3: t-Bu acrylate
Monomer 4: i-Bu acrylate
Monomer 5: Styrene
Monomer 6: 4-t-Bu styrene
Monomer 7: 2-acetoacetoxyethyl methacrylate (Formula 4)
Monomer 8: 2-(2-ethoxyethoxy)ethyl acrylate (Formula 5)
Monomer 9: (methoxypolyethylene glycol) methacrylate (Formula 6)
Monomer 10: 2-ethylhexyl acrylate
Initiator 1 dibenzoyl peroxide (BPO)
Initiator 2 lauroyl peroxide
Initiator 3 dibenzoyl peroxide & N,N-dimethyl aniline (DMA)
Initiator 4 cumene hydroperoxide (CHP) (Formula: $C_6H_5C(CH_3)_2OOH$) & Tetraethylenepentamine (TEPA) (Formula: $HN(CH_2CH_2NHCH_2CH_2NH_2)_2$)
Initiator 5 t-butyl peroxy-2-ethylhexanoate

TABLE 1

Graft copolymer with poly(isobutyl vinyl ether) (PIBVE) as starting polymer

| Ex. | Monomer Type | Monomer: PIBVE (wt) | Conc. [initiator]/M | Temp (° C.) | Appearance (20% in xylene) |
|---|---|---|---|---|---|
| 8 | 2 | 1 | 0.023 | 70 | Half transparency |
| 9 | 2 | 0.84 | 0.025 | 75 | Half transparency |
| 10 | 2 | 0.42 | 0.034 | 75 | turbid |
| 11 | 2 | 0.42 | BPO: 0.023 DMA: 0.0092* | 30 | Half transparency |
| 12 | 2 | 0.67 | 0.025 | 75 | turbid |
| 13 | 2 | 0.5 | 0.021 | 75 | turbid |
| 14 | 2 | 1.67 | 0.039 | 75 | turbid |
| 15 | 2 | 1.67 | 0.019 | 75 | turbid |
| 16 | 3 | 0.26 | CHP: 0.020 TEPA: 0.016** | 40 | clear |
| 17 | 3 | 0.26 | 0.022 | 75 | clear |
| 18 | 3 | 0.16 | 0.031 | 75 | clear |
| 19 | 3 | 0.64 | 0.026 | 75 | clear |
| 20 | 3 | 0.96 | 0.023 | 75 | clear |
| 21 | 3 | 0.32 | 0.029 | 75 | clear |
| 22 | 3 | 1.58 | 0.016 | 75 | clear |
| 23 | 4 | 0.28 | 0.029 | 75 | clear |
| 24 | 4 | 0.83 | 0.023 | 75 | clear |
| 25 | 4 | 0.55 | 0.020 | 75 | clear |
| 26 | 5 | 1.63 | 0.018 | 75 | turbid |
| 27 | 5 | 1.63 | 0.039 | 75 | turbid |
| 28 | 5 | 0.97 | 0.023 | 75 | clear but with fluorescent* |
| 29 | 5 | 0.77 | 0.023 | 75 | Clear* |
| 30 | 5 | 0.63 | 0.026 | 75 | clear |
| 31 | 5 | 0.45 | 0.022 | 75 | clear |
| 32 | 5 | 0.32 | 0.029 | 75 | clear |
| 33 | 5 | 0.16 | 0.031 | 75 | clear |
| 34 | 6 | 0.16 | 0.031 | 75 | clear |
| 35 | 6 | 0.29 | 0.029 | 75 | clear |
| 36 | 6 | 0.65 | 0.026 | 75 | clear |
| 37 | 6 | 0.98 | 0.025 | 75 | clear but with fluorescent |
| 38 | 7 | 0.79 | 0.029 | 75 | half transparency |
| 39 | 8 | 0.36 | 0.022 | 75 | half transparency |
| 40 | 9 | 0.55 | 0.025 | 75 | half transparency |
| 41** | 5 | 0.77 | 0.023 | 85 | Clear* |
| 42 | 2 | 0.62 | 0.030 | 80 | Turbid* |
| 43 | 5 | 0.63 | Initiator 5/0.025 | 80 | Clear* |
| 44*** | 3 | 0.26 | 0.022 | 85 | Clear* |

*15% in Solvesso 100;
**half of the initiator is in the flask and another half is added with the monomer;
***all the initiator was mixed with the monomer and added dropwise to the flask.

TABLE 2

Graft copolymer with starting polymer besides poly(isobutyl vinyl ether)

| Ex. | Starting Polymer | Monomer Type | Monomer: Starting Polymer (wt) | Initiator Type | Conc. [initiator]/ M | Temp (° C.) | Appearance (15% in Solvesso 100) |
|---|---|---|---|---|---|---|---|
| 45 | 1-C | 2 | 0.55 | 1 | 0.022 | 75 | Half transparency |
| 46 | 1-D | 7 | 0.84 | Initiator 1 Initiator 2 | BPO: 0.016 DMA: 0.008 | 75 | Half transparency |
| 47 | 1-E | 10 | 0.26 | 1 | 0.023 | 75 | clear |
| 48 | 1-F | 3 | 0.26 | 2 | 0.024 | 75 | clear |
| 49 | 1-G | 3 | 0.67 | 1 | 0.039 | 75 | clear |
| 50 | 1-H | 6 | 0.33 | 1 | 0.021 | 75 | Half transparency |
| 51 | 1-C | 5 | 0.45 | 3 | BPO: 0.016 DMA: 0.004 | 30 | clear |
| 52 | 1-J | 9 | 0.8 | 1 | 0.022 | 75 | clear |
| 53 | 1-K | 2 | 0.33 | 1 | 0.022 | 75 | turbid |
| 54 | 1-L | 5 | 0.42 | 1 | 0.023 | 75 | Half transparency |
| 55 | 1-M | 2 | 0.35 | 1 | 0.022 | 75 | turbid |
| se | 1-C | 8 | 0.36 | 4 | CHP: 0.012 TEPA: 0.01 | 40 | Half transparency |
| 57 | 1-N | 5 | 0.92 | 1 | 0.023 | 75 | turbid |
| 58 | 1-N | 5 | 0.52 | 5 | 0.030 | 80 | clear |

Performance Screening

Depending on the system being tested, the criteria for judgment were the foaming behaviour during application, the binder compatibility and/or the levelling of the paint surface.

Levelling was mainly assessed by using a formulation without levelling agent and levelling was judged visually from the dry drawdown film with particular care being taken to observe the so-called 'orange peel effect' and 'craters'. The pronounced 'orange peel effect' and 'craters' was considered a poor result, and a smooth homogeneous surface free from craters and with less haze was regarded as a good result.

Binder compatibility was evaluated visually by two ways. One was by in-can test, the in-Can haze is judged by ranking the haze level after the amount of related formulation was put in can and stirred at high shear rate. Another way was by drawdown test on polyethylene transparency film and/or on LENETA black and white cards. The film haze and defects which usually caused by incompatibility of the defoamer were assessed visually with particular care being taken to observe the so-called 'orange peel effect' and 'craters'. The pronounced 'orange peel effect' and craters was considered a poor result, and a smooth homogeneous surface free from craters and with haze as less as possible was regarded as a good result. The gloss of the film was measured after the card is dried by Sheen Tri-Glossmaster 260.

Defoaming behaviour was evaluated by two methods. One is in-can defoaming test which is judged by recording the height of macro/microfoam with time after stirring at high shear rate. The less foam formed and less height of foam left was thought as a good results. Another is Pour-Out test which is carried out by pouring the stirred let down system to a transparency PE film and the defoaming efficiency is judged by the foam's amount and type left on the film after curing. Usually the film with less foams was regarded as a good results.

Different formulations with different solid content and resins were used for different kind of tests. The dosage of the defoamer is 0.1%-0.7% in the formulation. Table 3 shows some abbreviations used in the following formulations. Table 4 describes the basic information of raw materials.

TABLE 3

| Name | Abbreviation |
|---|---|
| Butyl Acetate | BA |
| Propyl glycol methyl acetate | PMA |
| Dibutyltin dilaurate | DBTL |

TABLE 4

Basic Information of Raw Material in the formulation

| Name | Basic information |
|---|---|
| Setal 84 xx-70 | short oil alkyd resin from AkzoNobel |
| 3106-x-70 | short oil alkyd resin from Eternal Chemical |
| 3104-x-70 | alkyd resin from Eternal Chemical |
| 3755-80 | synthetic fatty acid resin from Eternal Chemical |
| 7360 | acrylic acid resin from Deuchem |
| Ciba ® EFKA ® 3033 | modified polysiloxane solution slip and leveling agent |
| Comparison polymer 1 | polyisobutyl vinyl ether, Mn = $3 \times 10^4$ g/mol |
| BYK 052 | silicone-free defoamer from BYK Chemie GmbH |
| L-75 | curing agent, Bayer |
| AC300 | silicone-free defoamer from Kyoeisha Chemical Co. Ltd |

Formulation 1 shown in Table 5 is used for the in-Can test, pour-out test and drawdown test. Together with the curing agent, L-75, the total solid content is about 48%.

TABLE 5

Clear Coating Formulation with Alkyd resin and levelling agent

| sn | Material | (g) | % |
|---|---|---|---|
| 1 | Setal 84 xx-70 | 8.52 | 56.2 |
| 2 | Mix Thinner* | 6.52 | 43.0 |
| 3 | Ciba ® EFKA ® 3033 | 0.06 | 0.4 |
| 4 | Defoamer sample | 0.06 | 0.4 |
| | total | 15.16 | 100.0% |

*Mix Thinner: Xylene:Butyl acetate = 2:1(wt)

The let down system was made according to the formulation. 40 g let down was put into the bottle and stirred at 4000 rpm for 2 min for in-Can test. The pour-out test and drawdown test were done immediately after mixing the let down with L75 at a ratio 3:1 and dispersed by the DISPERMAT with 4000 rpm for 1 minute.

Formulation 2 was alkyd resin formulation without levelling agent which could be adjusted for pour-out test and drawdown test at different solid content. Formulation with different solid content will lead to different viscosity. Usually higher viscosity induced by higher solid content will increase the difficult of defoaming.

TABLE 6

Clear Coating Formulation with alkyd resin and without levelling agent.

| Name | Materials | % |
| --- | --- | --- |
| 1 | 3106-x-70 | 79.3 |
| 2 | Mix thinner* | 20.3 |
| 3 | T12 (DBTL 12%) | 0.2 |
| 4 | Defoamer sample | 0.2 |

Thinner: BA:PMA = 9:1

Usage 1:

The let down system was made according to the above formulation and dispersed by the DISPERMAT at 2000 rpm for 2 minute. After at least 18 hours, the let down system are mixed with L75 and thinner (Butyl Acetate:PMA=9:1) at a ratio 3:1:2 with 1000 rpm for 1 minute. After that, the drawdown was carried out once/twice on the polyethylene transparency film and LENETA black/white cards. For the LENETA black/white cards, the drawdown was done by auto-applicator with spiral bar of 75 um and the film defects and gloss were evaluated. The drawdown on the transparent polyethylene film was done by auto-applicator of 100 um spiral bar. After heating the film for 1 hour in the oven)(60°, another draw down was done on the transparent polyethylene film by auto-applicator with 50 um spiral bar. After dry, the film haze and defects are evaluated for judging the sample's compatibility and levelling. The total solid content of coating is about 40%.

Usage 2:

The let down system is made according to the formulation and dispersed by the DISPERMAT at 2000 rpm for 2 minute. After at least 18 hours, the let down system are mixed with L75 and thinner at a ratio 9:3:1 and dispersed by the DISPERMAT with 2000 rpm for 1 minute. Then the mixer is used for pour-out test on the polyethylene transparency film. The amount and type of bubbles left on the dried film and transparency of the film will give the information of the defoaming performance and compatibility. The total solid content of this coating is about 56%.

Usage 3:

The let down system is made according to the formulation and dispersed by the DISPERMAT at 2000 rpm for 2 minute. After at least 18 hours, the let down system are mixed with L75 at a ratio 3:1 and dispersed by the DISPERMAT at 2000 rpm for 1 minute. Then the mixer is used for pour-out test on the polyethylene transparency film. The bubbles left on the dried film and transparency of the film will give the information of the defoaming performance and compatibility. The total solid content of this formulation is about 60%

Formulation 3: Clear Coating Formulation with Synthetic Fatty Acid Resin

TABLE 7

| sn | Materials | % |
| --- | --- | --- |
| 1 | 3755-80 | 79.3 |
| 2 | Mix thinner* | 20.4 |
| 3 | T12 (DBTL 12%) | 0.1 |
| 4 | Defoamer sample | 0.2 |
| | Total | 100 |

*mix thinner: BuOAc:PMA = 9:1

The let down system was made according to the above formulation and dispersed by the DISPERMAT at 2000 rpm for 2 minute. After at least 18 hours, the let down system are mixed with L75 and thinner (Butyl Acetate:PMA=9:1) at a ratio 3:1:2 with 1000 rpm for 1 minute. After that, the drawdown on the transparent polyethylene film was done by auto-applicator of 100 um spiral bar. After heating the film for 1 hour in the oven)(60°, another draw down was done on the transparent polyethylene film by auto-applicator with 50 um spiral bar. After dry, the film haze and defects are evaluated for judging the sample's compatibility and levelling.

For Pour-Out test, the let down system dispersed by the DISPERMAT at 1000 rpm for 1 minute. Then the mixer is immediately used for pour-out test on the polyethylene transparency film. The amount and type of bubbles left on the dried film and transparency of the film will give the information of the defoaming performance and compatibility.

Formulation 4: Clear Coating Formulation with Acrylic Acid Resin

TABLE 8

| sn | Materials | % |
| --- | --- | --- |
| 1 | 7360 | 79.3 |
| 2 | Mix thinner* | 20.5 |
| 3 | Defoamer sample | 0.2 |
| | Total | 100 |

*mix thinner: BuOAc:PMA = 9:1

Usage 1:

The let down system was made according to the above formulation and dispersed by the DISPERMAT at 2000 rpm for 2 minute. After at least 18 hours, the let down system are mixed with L75 and thinner (Butyl Acetate:PMA=9:1) at a ratio 3:1:2 with 1000 rpm for 1 minute. After that, the drawdown on the transparent polyethylene film was done by auto-applicator of 100 um spiral bar. After heating the film for 1 hour in the oven (60), another draw down was done on the transparent polyethylene film by auto-applicator with 50 um spiral bar. After dry, the film haze and defects are evaluated for judging the sample's compatibility and levelling.

For Pour-Out test, the let down system dispersed by the DISPERMAT at 1000 rpm for 1 min. Then the mixer is immediately used for pour-out test on the polyethylene transparency film. The amount and type of bubbles left on the dried film and transparency of the film will give the information of the defoaming performance and compatibility.

Formulation 5: Primer Formulation with Alkyd Resin

TABLE 9

| sn | Materials | % |
|---|---|---|
| 1 | 3104-x-70 | 65.5 |
| 2 | E-4010 | 0.2 |
| 3 | F-881-B Bentonite | 0.4 |
| 4 | Zinc stearate | 3 |
| 5 | Talcum(1250 mesh) | 1 |
| 6 | T12 | 0.2 |
| 7 | Mix thinner* | 29.5 |
| 8 | Defoamer sample | 0.2 |
| | Total | 100 |

*mix thinner: BuOAc:PMA = 9:1

The primer let down system is made according to the formulation. For pour-out test, after at least 18 hours, the let down system are mixed with L75 at a ratio 4:1 and dispersed by the DISPERMAT with 1000 rpm for 1 minute. Then the mixer is used for pour-out test on the polyethylene transparency film. The amount and type of bubbles left on the dried film will give the information of the defoaming performance.

For drawdown test, the let down system are mixed with L75 and thinner (BA:PMA=9:1) at 4:1:3 and dispersed by the DISPERMAT at 1000 rpm for 1 minute. After that, the drawdown on the transparent polyethylene film was done by auto-applicator of 100 um spiral bar. After heating the film for 1 hour in the oven (60), another draw down was done on the transparent polyethylene film by auto-applicator with 50 um spiral bar. After dry, the film defects and levelling performance are evaluated for judging the sample's compatibility and levelling.

Screening test: Basically, the performance of examples 1-58 in Table 3-4 were tested according to Formulations 1-5. It was observed, that for most of the samples, their compatibility were improved to some content while still keeping high defoaming efficiency. In general, some leading examples were taken as the representative defoamer, and partial of the testing results were summarized in the following tables.

Results:

Table 10 shows the gloss results of films on the black/white card by using Formulation 2 with usage 1. The samples shown here, Ex. 1, 9, 10, 17, 31, is with 20% solid content. It's obviously that the samples show higher gloss compared with the benchmark.

TABLE 10

| | Gloss of films | | | | | |
|---|---|---|---|---|---|---|
| | Comparison polymer 1 | Ex. 31 | Ex. 17 | Ex. 9 | Ex. 1 | Ex. 10 |
| 20° black | 53 | 68.5 | 67.3 | 68.6 | 66.4 | 68.9 |
| 20° white | 76.2 | 79.9 | 83.5 | 82.3 | 81.9 | 82.9 |
| 60° black | 86.5 | 94.1 | 94.1 | 94.1 | 93.7 | 94.1 |
| 60° white | 92.7 | 97.2 | 98.1 | 98.1 | 97.9 | 97.5 |

The screen results of several leading samples are shown in Table 11, 12, 13 &14. The results in Table 11 are using Formulation 2 with usage 1 & 2 and the results in Table 12, 13 and 14 are using Formulation 3, 4 and 5 respectively. The samples, example 2, 4, 5, 13, 17 and 29, 50 are with 15% solid content.

TABLE 11

Screen Results of Clear Coating with Short Oil Alkyd Resin Formulation

| | Comparison polymer 1 | Ex. 2 | Ex. 4 | Ex. 5 | Ex. 13 | Ex. 17 | Ex. 29 | Ex. 50 | BYK-052 | AC300 |
|---|---|---|---|---|---|---|---|---|---|---|
| Defoaming Efficiency (from pour out test) | 2 | 2 | 4 | 3 | 2 | 3 | 3 | 2 | 1 | 4 |
| Transparency in Can | 5 | 1 | 1 | 1 | 2 | 2 | 1 | 1 | 4 | 3 |
| Haze on Film | 4 | 2 | 1 | 2 | 2 | 2 | 1 | 1 | | 3 |
| levelling | 4 | 2 | 1 | 1 | 2 | 2 | 2 | 2 | 4 | 2 |
| Surface Quality (Crater) | 5 | 1 | 1 | 1 | 3 | 2 | 2 | 2 | 5 | 2 |
| Gloss | 4 | 2 | 1 | 1 | 2 | 2 | 2 | 1 | 2 | 2 |

1 very good, 5 bad;
Transparency in can: 1-no haze; 2-a little haze; 3 and 4- haze; 5-opacity

TABLE 12

Screen Results of Clear Coating with Fatty Acid Resin Formulation

| | Comparison polymer 1 | Ex. 2 | Ex. 4 | Ex. 5 | Ex. 13 | Ex. 17 | Ex. 29 | Ex. 50 | BYK-052 | AC300 |
|---|---|---|---|---|---|---|---|---|---|---|
| Defoaming Efficiency (from pour out test) | 4 | 2 | 3 | 2 | 2 | 2 | 2 | 2 | 4 | 2 |
| Transparency in Can | 5 | 2 | 1 | 2 | 4 | 3 | 2 | 1 | 5 | 3 |
| Haze on Film | 4 | 2 | 1 | 2 | 2 | 2 | 2 | 1 | 4 | 2 |
| Surface Quality (Crater) | 4 | 2 | 1 | 2 | 2 | 2 | 2 | 2 | 4 | 2 |

1 very good, 5 bad,
Transparency in can: 1-no haze; 2-a little haze; 3 and 4- haze; 5-opacity

TABLE 13

Screen Results of Clear Coating with Acrylic Acid Resin Formulation

|  | Comparison polymer 1 | Ex. 2 | Ex. 4 | Ex. 5 | Ex. 13 | Ex. 17 | Ex. 29 | Ex. 50 | BYK-052 | AC300 |
|---|---|---|---|---|---|---|---|---|---|---|
| Defoaming Efficiency (from pour out test) | 1 | 3 | 4 | 2 | 3 | 3 | 2 | 2 | 1 | 2 |
| Transparency in Can | 5 | 3 | 4 | 2 | 3 | 3 | 2 | 1 | 4 | 3 |
| Haze on Film | 2 | 1 | 1 | 2 | 1 | 1 | 1 | 1 | 2 | 2 |
| Surface Quality (Crater) | 4 | 3 | 1 | 2 | 3 | 2 | 3 | 1 | 4 | 2 |

1 very good, 5 bad
Transparency in can: 1-no haze; 2-a little haze; 3 and 4- haze; 5-opacity

TABLE 14

Screen Results of Primer System with Alky Resin Formulation

|  | Comparison polymer 1 | Ex. 2 | Ex. 4 | Ex. 5 | Ex. 13 | Ex. 17 | Ex. 29 | Ex. 50 | BYK-052 | AC300 |
|---|---|---|---|---|---|---|---|---|---|---|
| Defoaming Efficiency (from pour out test) | 1 | 3 | 4 | 5 | 3 | 3 | 3 | 3 | 2 | 3 |
| Surface Quality (Crater) | 3 | 2 | 1 | 1 | 1 | 1 | 4 | 1 | 3 | 5 |
| Levelling | good | Good | Good | Best | Good | Good | Good | Good | Good | normal |

Obviously, the excellent performance of our samples in several clear coating and primer system proves that the idea and the samples of our invention have its advantage.

The invention claimed is:

1. A coating composition comprising a resin binder component and a defoamer formulation, wherein the defoamer formulation comprises a), b), and c) defined below:

a) a graft copolymer of the Formula

wherein

A are polymerizable monomers or comonomers selected from the group consisting of alkyl vinyl ether, phenyl vinyl ether, allyl ether, acrylate, methacrylate, olefin, maleic anhydride and styrene;

$[A]_m$ represents a homopolymer or copolymer or a mixture thereof containing one or more monomers A and being a graft backbone and being selected from the group consisting of poly alkyl vinyl ether, poly phenyl vinyl ether, poly allyl ether, polyacrylate, poly methacrylate, poly (alkyl vinyl ether-co-acrylate), polypropylene, polybutadiene, alkyl vinyl ether-maleic anhydride copolymer, polystyrene, copolymers thereof and mixtures thereof;

$[B]_n$ resents units in the backbone $[A]_{m+n}$ where a branch is grafted from a unit in the backbone;

Y are polymerizable monomers or comonomers selected from the group consisting of (meth)acrylate, styrene and vinyl acetate;

$[Y]_p$ is a grafting chain which is a homo/copolymer of one or more monomers selected from the group consisting of (meth)acrylate, styrene and vinyl acetate;

p=1-5000,
m is a number between 1-5000,
n is a number of 1-5000; and
m+n is a number of 30-5000;

b) polymer, mixed polymers or copolymer $[A]_{m+n}$; and c) polymer, mixed polymer or copolymer of the monomer(s) Y.

2. A coating composition according to claim 1, wherein $[A]_m$ is a homopolymer or copolymer of poly alkyl vinyl ether or poly phenyl vinyl ether.

3. A coating composition according to claim 2, wherein $[A]_m$ is selected from the group consisting of poly methyl vinyl ether, poly ethyl vinyl ether, n-propyl vinyl ether, poly isopropyl vinyl ether, poly n-hexyl vinyl ether, poly isobutyl vinyl ether (PIBVE), poly t-butyl vinyl ether, poly-2-ethylhexyl vinyl ether, poly hydroxyl butyl vinyl ether, poly cyclohexyl vinyl ether, polyvinyl ether of Formula $CH_2=CH-O-(CH_2)_2-(CF_2)_6-CF_3$ and polyvinyl ether of Formula $CH_2=CH-O-(CH_2)_4-(CH_2-CH_2-O)_8-CH_3$.

4. A coating composition according to claim 1, wherein $[A]_m$ is a homopolymer or copolymer of polyacrylate, polymethacrylate or polystyrene.

5. A coating composition according to claim 4, wherein A is selected from the group consisting of methyl (meth)acrylate, t-butyl (meth)acrylate, i-butyl (meth)acrylate, 2-ethylhexyl (meth)acrylate, 2-acetoacetoxyethyl (meth)acrylate (Formula 4), 2-(2-ethoxyethoxy)ethyl acrylate (Formula 5) and (methoxy polyethylene glycol) (meth)acrylate (Formula 6)

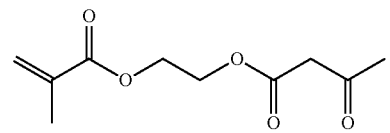

4

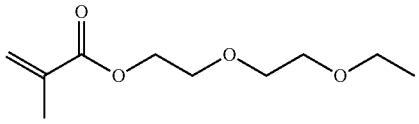

5

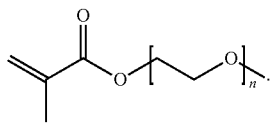

n = 1-30

6. A coating composition according to claim 1 wherein [A]$_m$ is a polypropylene, polybutadiene.

7. A coating composition according to claim 1, wherein [A]$_m$ is a copolymer of alkyl vinyl ether; a copolymer of (meth)acrylate or a copolymer of alkyl vinyl ether and (meth)acrylate.

8. A coating composition according to claim 1, wherein [A]$_m$ is a polymer mixture.

9. A coating composition according to claim 1, wherein the grafting chain [Y]$_p$ is a homo/copolymer of one or more monomers selected from the group consisting of (meth)acrylate, styrene and vinyl acetate.

10. A process to prepare a coating composition according to claim 1 by polymerizing monomer Y in the presence of starting (co)polymer [A]$_m$ at 10-150° C. thus obtaining a mixture of a graft copolymer as described in claim 1, starting polymer [A]$_m$ and polymer(s) formed by monomer(s) Y and adding said mixture to a binder resin.

* * * * *